United States Patent
Saalman (10) Patent No.: US 6,983,126 B1
(45) Date of Patent: Jan. 3, 2006

(54) AUDIO TRANSMITTER AND REMOTE CONTROL RECEIVER AND STORAGE APPARATUS

(76) Inventor: Steve Saalman, 1048 15th St., Tell City, IN (US) 47586

( * ) Notice: Subject to any disclaimer, the term of this patent is extended or adjusted under 35 U.S.C. 154(b) by 790 days.

(21) Appl. No.: 09/976,575

(22) Filed: Oct. 15, 2001

(51) Int. Cl.
*H04B 7/00* (2006.01)
*H04N 5/44* (2006.01)

(52) U.S. Cl. .............. 455/66.1; 455/151.2; 455/352; 455/350; 455/95; 455/180.2; 348/734; 341/176

(58) Field of Classification Search .......... 455/66.1, 455/100, 157.2, 352, 355, 95, 92, 166.1, 455/180.2, 182.2, 183.2, 151.1, 67.11, 67.13, 455/186.2; 340/825, 72; 381/370; 348/734, 348/570, 731, 735; 174/52.1; 200/333; 206/320; 341/21, 22, 176
See application file for complete search history.

(56) References Cited

U.S. PATENT DOCUMENTS

| | | | |
|---|---|---|---|
| 4,375,651 A * | 3/1983 | Templin et al. ............. 348/731 |
| 4,809,360 A | 2/1989 | Kraft | |
| 5,095,382 A * | 3/1992 | Abe ........................... 398/202 |
| 5,189,517 A | 2/1993 | Ohara | |
| 5,368,159 A | 11/1994 | Doria | |
| 5,408,044 A | 4/1995 | Spiegel | |
| 5,598,143 A * | 1/1997 | Wentz ................... 340/539.32 |
| 5,648,757 A | 7/1997 | Vernace | |
| 5,794,127 A | 8/1998 | Lansang | |
| 6,148,087 A | 11/2000 | Martin | |
| 6,320,503 B1 * | 11/2001 | Dunn et al. ............ 340/539.32 |

* cited by examiner

*Primary Examiner*—Curtis Kuntz
*Assistant Examiner*—Dionne Harvey
(74) *Attorney, Agent, or Firm*—Aileen Champion Addessi (57) ABSTRACT

An audio transmitter and remote control unit receiver and storage apparatus for transmitting audio signals from electronic equipment, such as a television set, to individuals remotely located therefrom includes an audio transmitter for disposition adjacent to the electronic equipment and an audio receiver and remote control unit storage case positioned remotely form the electronic equipment. The audio transmitter having electronic circuitry for receiving audio transmissions from the electronic equipment and an audio antenna or IR sender for transmitting audio signals to remote locations. The audio receiver and remote control unit storage case having a floor and a pair of opposed sidewalls forming a receptacle for holding therein a remote control unit, a receiver antenna or IR detector for detecting audio signals conveyed from the audio transmitter, and an audio output speaker for broadcasting audio conveyed from the electronic equipment to the adjacently positioned individual.

19 Claims, 6 Drawing Sheets

ND REMOTE
AUDIO TRANSMITTER AND REMOTE CONTROL RECEIVER AND STORAGE APPARATUS

BACKGROUND OF THE INVENTION

The present invention pertains to audio transmitters and portable storage cases, and, more particularly, pertains to an audio transmitter for electronic equipment and a portable remote control unit receiver and storage apparatus.

Home entertainment options and choices have changed and expanded dramatically since the mid-twentieth century. Where homes once had only a small television screen encased in plywood with just three channels and a cabinet-sized, floor standing radio, many homes in the wired twenty-first century boast an entertainment center that includes a surround sound stereo/CD player system, video cassette recorder, multi-channel television set with a satellite disk link, and a personal computer connected to the Internet. In such a wrap-around home entertainment environment, it is essential to have a reliable, durable, and handy control device or system for operating the various pieces of electronic entertainment equipment. Although a few innovatively designed homes have their entire entertainment systems, including the control devices, interconnected with and programmed into the internal residential wiring system, in the majority of homes separate control devices are still utilized for each separate piece of electronic entertainment equipment.

Thus, separate hand operable remote control units are used to control each separate television set and video cassette recorder. Also, combination CD players and stereos will come with their own control unit. As a result of the proliferation of control units, there is the tendency to lose them amongst the clutter of household items and furnishings; or the remote control units invariably get misplaced and then accidentally broken as they are sat or stepped on.

Moreover, a major disadvantage with all remote control units is that while they can control channel selection and audio volume, they are unable to control the direction of audio broadcast. Consequently, everyone seated or situated in a game room or living room will be barraged by the same audio, whether emanating from the CD player, television set or VCR; and the primary recourse to avoiding such sounds is simply to leave the room.

Therefore, the prior art discloses a number of devices that both store and protect remote control units as well as direct audio from, for example, a television set or VCR to an individual at a defined place or location.

Kraft (U.S. Pat. No. 4,809,360) discloses a housing for storing a remote control unit. The housing includes a drawer which opens and closes similar to a file cabinet drawer, and the housings are capable of being stacked or mated together in various configurations. However, it is likely that stacking the housings together will increase their bulk and add one more object to clutter the entertainment room, living room, or dining room.

Ohara (U.S. Pat. No. 5,189,517) discloses a remote unit for operating a television set. The remote unit includes a speaker and clock, and is linked to the television set by a cord or by a wireless link. The use of a cord would be impractical as the cord length would tether the individual in proximity to the television set; and use of the wireless link would render Ohara's device essentially no different from already existing remote control units.

Doria (U.S. Pat. No. 5,368,159) discloses a case for protecting remote control units. The case includes two attachable shells for containing the remote control unit, but the case is not electrically linked in any way to electronic equipment nor does the case include audio speakers.

Spiegel (U.S. Pat. No. 5,408,044) discloses a protective housing for holding a remote control unit therein by a spring retainer clip. The protective housing also includes oversized pushbuttons that align with the remote control unit's pushbuttons in order to aid individuals that have limited or diminished visual or manual abilities.

Spiegel's protective housing doesn't include audio speakers.

Vernace (U.S. Pat. No. 5,648,757) discloses a remote control protective holder and detection device which includes a detection means for locating the remote controller. When either the remote control holder is moved or the television is turned on, an audio signal is generated from a piezo transducer to allow an individual to locate the remote controller. Vernace's device does not include conveying audio sound from the television speaker to the individual.

Lansang (U.S. Pat. No. 5,794,127) discloses a headphone remote control device that incorporates the functions of both a remote control unit and a standard headphone. However, use of Lansang's headphone device compels an individual to wear headphones while watching television, and thus that individual cannot participate in any conversation or activity going on around him or her because wearing the headphones impedes social interaction.

Martin (U.S. Pat. No. 6,148,087) discloses a hearing aid wherein one hearing apparatus is attached to each side bow of hearing-aid glasses, and each hearing apparatus includes an optical signal transmitter/receiver for permitting optical signal transmission therebetween.

Nonetheless, despite the ingenuity of the above-described devices there remains a need for an audio transmitter and remote control receiver and storage apparatus that both protects and contains at least one remote control unit and also detects and then conveys audio transmissions from a television set, or other piece of electronic equipment, to a remote control unit adjacent and handy to an individual while minimizing audio interference for other individuals that are located in and about the same room or area.

SUMMARY OF THE INVENTION

The present invention comprehends an audio transmitter and portable remote control unit receiver and storage apparatus for protecting and holding a remote control unit and also for conveying audio from electronic equipment through an audio transmitter and to a receiver and storage case that is located immediately adjacent to an individual and which holds the remote control unit.

The audio transmitter remote control unit receiver and storage apparatus of the present invention includes an audio transmitter that can be mounted directly to the electronic equipment, such as the television set, or can be positioned adjacent thereto. The audio transmitter is configured to receive audio transmissions from the electronic equipment by an electrical cord that connects the audio jack of the electronic equipment to an audio input port located on a sidewall of the audio transmitter. When not in direct electrical connection with the electronic equipment, the audio transmitter can receive audio transmissions emanating from the electronic equipment by an audio detection portal that has front and rear openings on the front and rear sides of the audio transmitter. The audio transmitter also includes a transmitter cradle portion having an on/off switch that is selectively shiftable between an on position and an off position, or alternatively, any type of on/off switching system, and internal transmitter circuitry for converting audio transmissions received from either the audio input port or the audio detection portal into audio signals that can then be conveyed from the audio transmitter by a retractable audio transmitter antenna electrically integrated with the internal transmitter circuitry of the audio transmitter.

The audio transmitter remote control unit receiver and storage apparatus of the present invention also includes a combination audio receiver and remote control unit storage case that is separate from, but operates in conjunction with, the audio transmitter. The audio receiver remote control unit storage case is placed immediately adjacent to an individual (usually seated in the entertainment, living or dining room), and thus the audio receiver remote control unit storage case would generally be located some distance from both the audio transmitter and the electronic equipment such as the television set. The audio receiver remote control unit storage case includes a hold or receptacle for securely holding therein at least one remote control unit. In addition, the audio receiver remote control unit storage case includes a receiver antenna that should be oriented to receive audio signals conveyed from the audio transmitter antenna, and an audio output speaker for broadcasting audio converted from the audio signals by internal receiver circuitry to the adjacently positioned individual. The audio receiver remote control unit storage case may also include a bridging member that is selectively engaged to, or disengaged from, the transmitter cradle portion of the audio transmitter in order to turn the apparatus on and off, or alternatively, may include any type of on/off switching system.

It is an objective of the present invention to provide an audio transmitter and remote control unit receiver and storage apparatus that transmits audio from electronic equipment, such as a television set, instantaneously to an individual engaged in television viewing, or other activity.

It is another objective of the present invention to provide an audio transmitter and remote control unit receiver and storage apparatus having a storage case that can accept and contain therein remote control units having various sizes and shapes.

Yet another objective of the present invention is to provide an audio transmitter and remote control unit receiver and storage apparatus that directs audio from a television set to the individual but does not hinder the individual from hearing other sounds or conversing with someone.

Still another objective of the present invention is to provide an audio transmitter and remote control unit receiver and storage apparatus wherein a number of audio receiver remote control unit storage cases, each holding one remote control unit or not holding a remote control, can be placed at different positions within a large area, such as a sports bar, restaurant, or classroom, and yet receive audio signals from just one audio transmitter because the audio receiver remote control unit storage cases and the audio transmitter are all configured to detect and respond to the same radio frequency, or alternatively, can receive audio signals from at least two channels because the audio receiver remote control unit storage cases and the audio transmitter can be configured to detect and respond to at least two selected radio frequencies for enabling a person to choose which television station, etc. to listen to.

Still yet another objective of the present invention is to provide at least two channels to select so that interference from an adjacent stereo, television, or other electronic device will not be on the same channel.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DETAILED DESCRIPTION OF THE PREFERRED EMBODIMENT

Illustrated in FIGS. 1–10 is a portable audio transmitter and remote control unit receiver and storage apparatus 10 for use with electronic equipment such as a VCR, a CD player, a home stereo, or a television set. The apparatus 10 includes two structural components or devices that are used in conjunction to first detect and receive audio transmissions from the above-described electronic equipment and then to convert the received audio transmissions into audio signals that are sent or conveyed to a location immediately adjacent to an individual generally seated in a living room, dining room, game room or home entertainment room so that the audio can be heard by that individual while minimizing sound interference for other individuals.

Shown in FIGS. 1, 5, 6, and 10 is an audio transmitter 12 that detects audio transmissions from, for example a television set, and then converts the received audio transmissions by standard transmitter circuitry into audio signals that can then be sent or conveyed to another device to be hereinafter further described. The audio transmitter 12 includes a first top or front side 14, an opposite second bottom or back side 16, and peripheral sidewalls 18 that join the front side 14 and the back side 16. The front side 14 has a stepped portion that defines a receiver engaging lip 20, and located on the receiver engaging lip 20 are two spaced-apart battery recharge poles 22.

As illustrated in FIGS. 1, 5, 6, and 10 the audio transmitter 12 has several different ways to detect or pick up audio transmissions from the television set 24, which will hereinafter be used as the representative example of electronic equipment. The audio transmitter 12 includes an audio detection portal 26 that has front and rear openings 28 and 30 on the front side 14 and back side 16. Alternatively, the audio detection portal 26 may be only one opening in the audio transmitter 12. The audio detection portal 26 can pick up sound from the television set 24 when the audio transmitter 12 is placed in proximity to the television set 24, and the audio detection portal 26 doesn't require that a direct electrical connection be established between the audio transmitter 12 and the television set 24. Thus, the audio detection portal 26 can be used for picking up audio from any television set, including later model television sets that can't transmit audio through an electrical connection to external audio receiving equipment.

Figure 10:
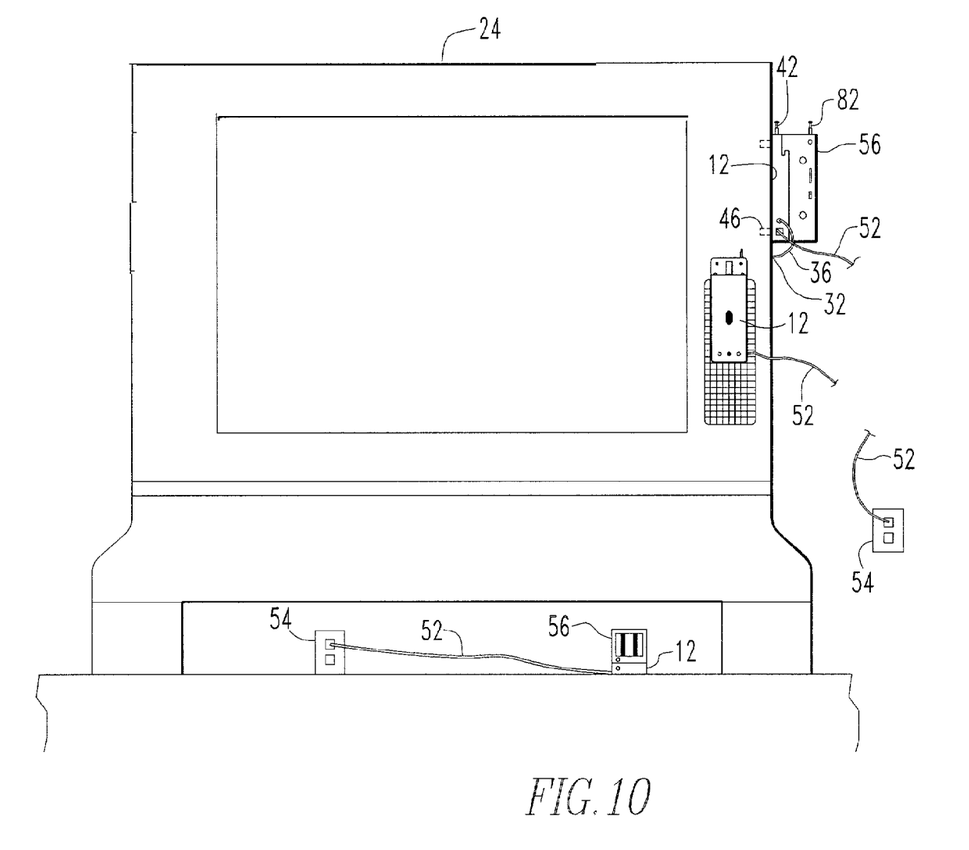
FIG. 10 is a front elevational view illustrating several methods of mounting the apparatus either on or adjacent to a television set.

However, for newer model television sets, like the television set 24 illustrated in FIG. 10, and that come with an audio jack 32, the audio transmitter 12 includes an audio input port 34 located on one of the peripheral sidewalls 18. An electric cord 36 can then be plugged into the television audio jack 32 and the audio input port 34 of the audio transmitter 12 for conveying audio transmissions from the television set 24 directly into the audio transmitter 12 whereupon the audio transmissions are decoded and converted into audio signals by the internal transmitter circuitry 37.

Figure 1:
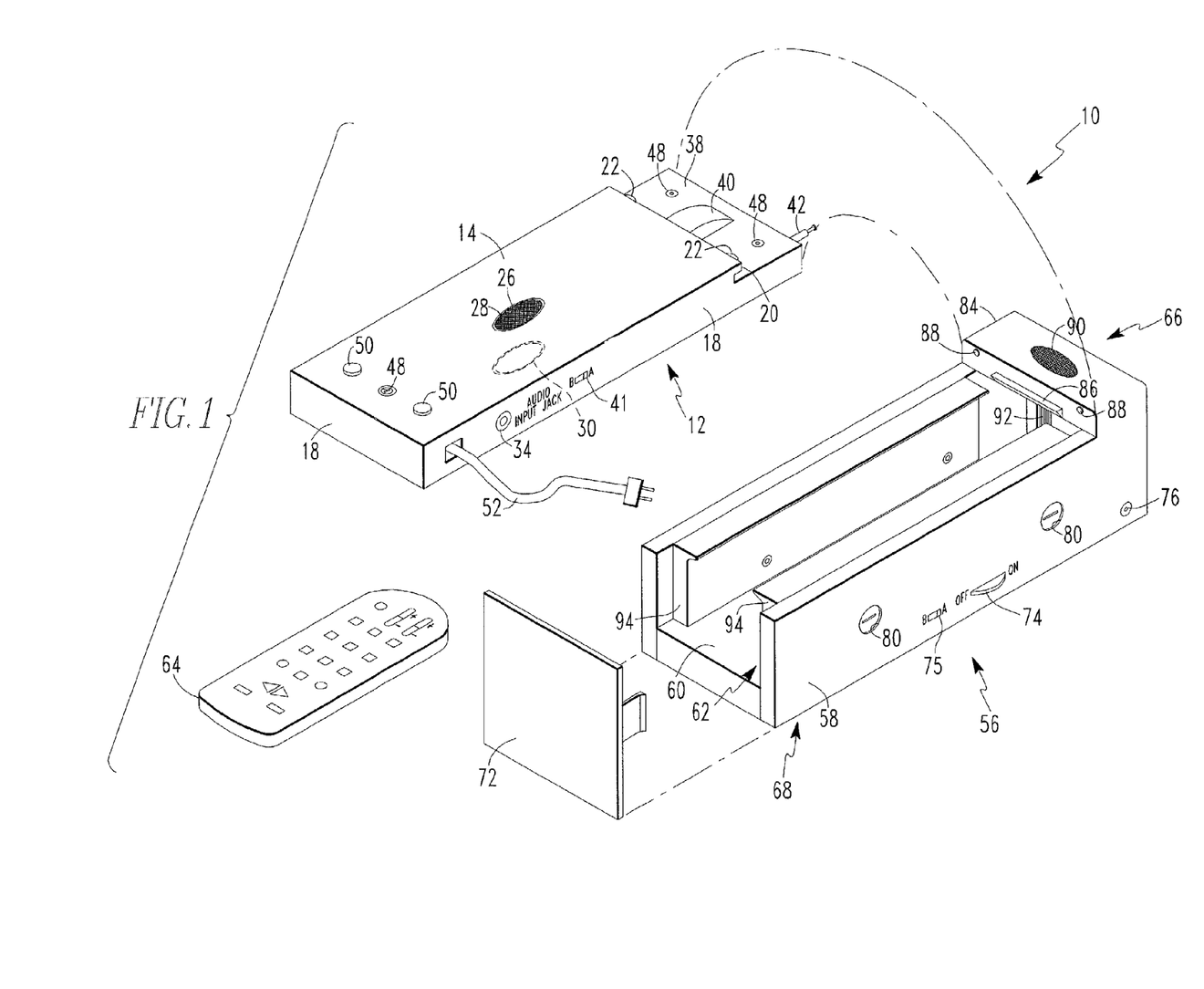
FIG. 1 is an exploded view of the apparatus of the present invention.
Figure 6:
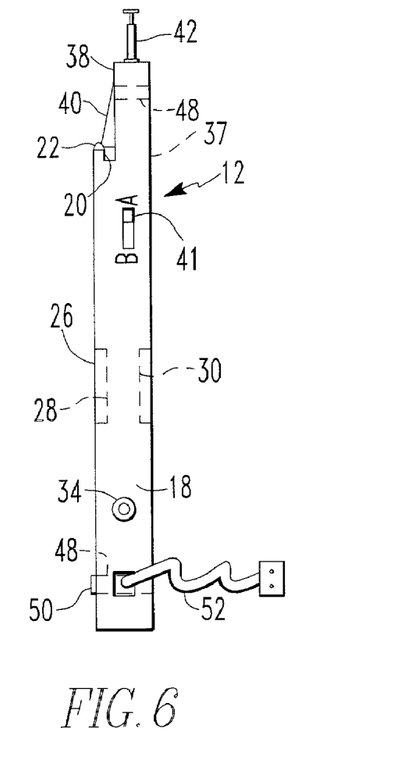
FIG. 6 is a side elevational view of the audio transmitter.

As shown in FIGS. 1 and 6, the stepped portion of the audio transmitter 12 further defines a transmitter cradle portion 38, and centrally located on the transmitter cradle portion 38 is an on/off switch 40, such as a rocker switch, that is selectively shiftable between an on position and an off position. The audio transmitter 12 also has a channel select switch 41 for providing several channels to select from for reducing interference from adjacent electrical pieces of equipment that may be on the same channel, or for choosing between different channels on a television or between different types of electronic devices. In order to send the audio transmissions that have been converted into audio signals to the other component device comprising the apparatus 10 and hereinafter further described, the audio transmitter 12 includes a retractable audio transmitter antenna 42 mounted to one sidewall 18 adjacent the transmitter cradle portion 38, and which is electrically integrated with the internal transmitter circuitry 37.

The audio transmitter 12 can be placed on the floor 44 adjacent to the television set 24, or the audio transmitter 12 can be directly mounted to the television set 24 (both dispositions are shown in FIG. 10) by inserting fasteners 46 through mounting screw apertures 48 that extend through the body of the audio transmitter 12. Alternatively, the audio transmitter 12 may be mounted by any type of connector means, such as a clip, fibrous adhesive patches marketed under the tradename Velcro, or the like.

Figure 5:
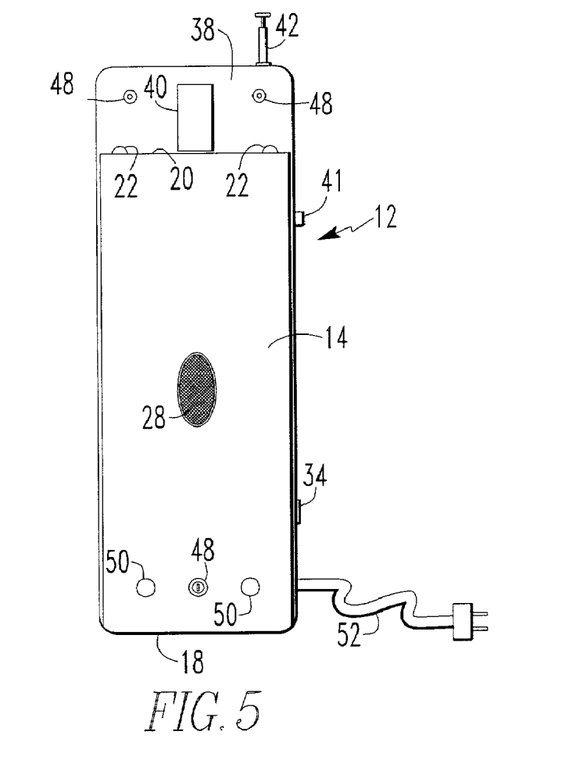
FIG. 5 is a front elevational view of an audio transmitter.

A pair of spaced-apart stand-off pads 50 are located on the front side 14 and facilitate the engagement and mating of the audio transmitter 12 to the companion device hereinafter further described. The pads 50 also provide spacing between the receiver 56 and the transmitter 12 to prevent activation of the remote control buttons during engagement of the receiver 56 onto the transmitter 12. An electrical cord 52 generally located adjacent to the audio input port 34 can be plugged into a standard household outlet or receptacle 54, into a step down transformer, or the audio transmitter 12 may be battery operated.

Illustrated in FIGS. 1–3 and 10 is an audio transmitter remote control unit receiver and storage case 56 that is the companion device and is used in conjunction with the audio transmitter 12 for receiving and broadcasting audio to an individual seated adjacent to the receiver and storage case 56. The receiver and storage case 56 includes a pair of opposed side walls 58 extending upwardly from a generally rectangular-shaped floor 60. The sidewalls 58 and the floor 60 form a hold or receptacle 62 for receiving and containing therein a remote control unit 64. The receiver and storage case 56 is further defined by a front end 66 and opposite rear end 68. Located adjacent the rear end 68 of the floor 60 is a battery cavity 70 for receiving and holding therein a rechargeable battery. The hold or receptacle 62 is closed with a removably attachable snap-on lid 72. The storage case 56 will stand on end on the snap-on lid 72. Enclosed within the floor 60 are standard electronic receiver circuitry 73, including audio or channel selectivity, that is integrated with the rechargeable battery, channel selectivity, and other structural elements hereinafter further described.

Figure 2:
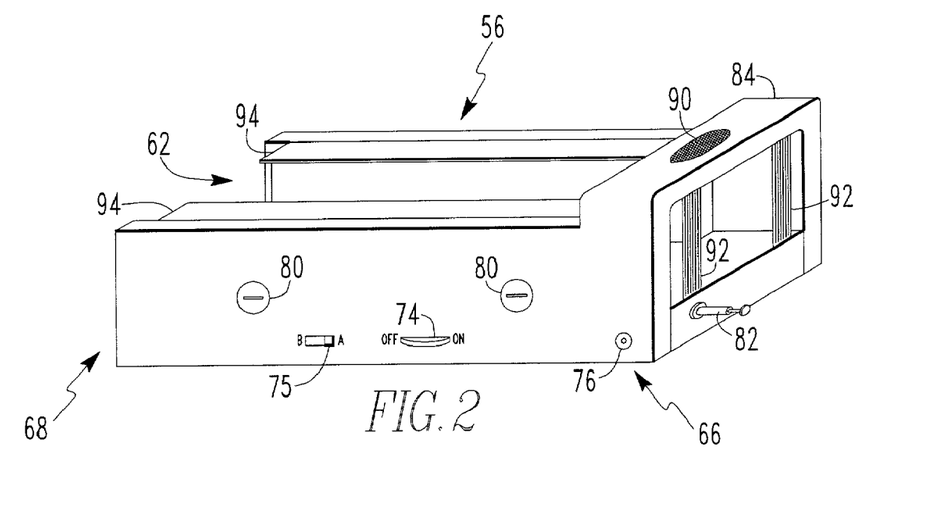
FIG. 2 is a perspective view of a remote control unit receiver and storage case.
Figure 3:
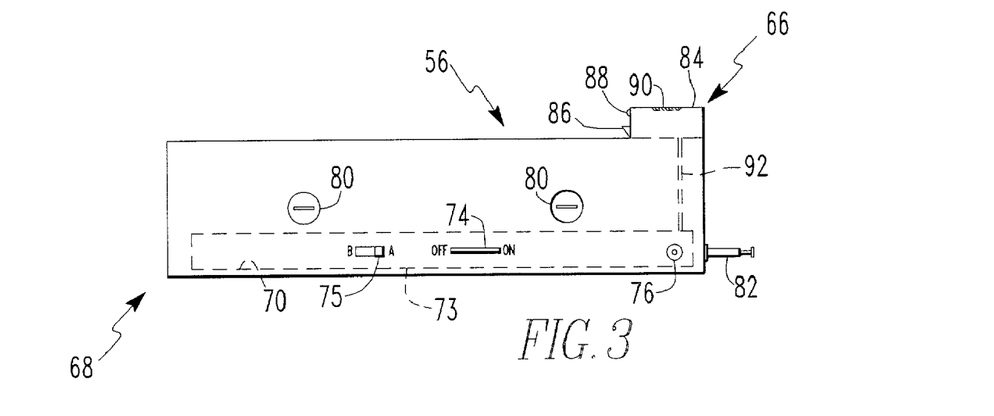
FIG. 3 is a side elevational view of the remote control unit receiver and storage case.
Figure 4:
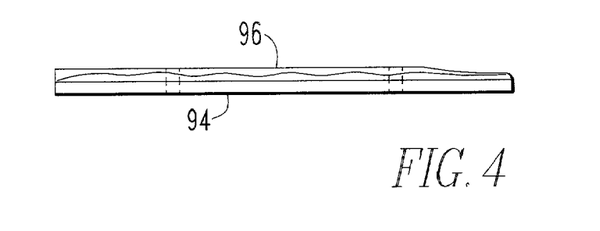
FIG. 4 is a side elevational view of one spacer bracket for disposition within a hold of the remote control unit receiver and storage case.
Figure 8:
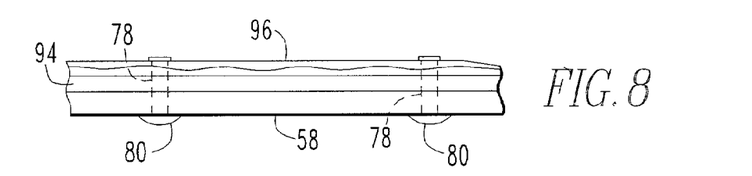
FIG. 8 is a sectioned elevational view illustrating the attachment of one spacer bracket to a sidewall of the remote control unit receiver and storage case.

As shown in FIGS. 1–3, one sidewall 58 includes an on/off switch 74, an A-B dual or multi-channel select channel switch 75, and an earphone jack 76, all of which are electrically integrated with the receiver circuitry 73. A headphone (not shown) may be inserted into the earphone jack 76 to provide audio through the headphone. In addition, both sidewalls 58 include at least a pair of spaced-apart spacer bracket adjustment apertures 78, as shown in FIG. 8, for receiving therein fasteners 80 that hold structural elements to the sidewalls 58 and whose function will be more fully described hereinafter. Adjacent the front end 66 of the receiver and storage case 56 is a retractable receiver antenna 82 for picking up audio signals sent from the audio transmitter antenna 12 for processing and conversion into audio by the receiver circuitry.

Alternatively, the antennas 42 and 82 may be positioned in any suitable location for transmitting and receiving audio signals. The antennas 42 and 82 may be conventional antennas as illustrated in FIGS. 1 and 2, which either telescope or not, may be IR senders or transmitters and IR detectors or receivers, or may be any other suitable type of transmitters and receivers for conveying signals therebetween. Another alternative includes the audio transmitter and receiver transmitting and receiving in either mono or stereo.

Illustrated in FIGS. 1, 3 and 10 is the structural element which allows the apparatus 10 to be hung up when not in use and also facilitates battery recharge and audio output. More specifically, the receiver and storage case 56 includes a bridging member 84 that is located at the front end 66 and mounted on the sidewalls 58. The bridging member 84 includes a hang-up lip or overhang 86 that projects toward the rear end 68 and is shaped to mate with the receiver engaging lip 20 of the audio transmitter 12.

The bridging member 84 also includes a pair of spaced-apart battery recharge contacts 88 that are aligned with the battery recharge poles 22 of the audio transmitter 12, and when the receiver storage case 56 is brought in contact with and hung up on the audio transmitter 12 the battery recharge contacts 88 and battery recharge poles 22 are brought into engagement to permit battery recharge. As an alternative to the use of rechargeable batteries, replaceable, disposable batteries may be housed within the battery cavity 70 and used to provide power to the receiver 56. For this embodiment, it would not be necessary to hang up the receiver 56 onto the transmitter 12 as is required to recharge the rechargeable batteries. In place of the rocker switch may be any other type of on/off switch 40 for selectively turning the transmitter 12 on and off.

In addition, the bridging member 84 includes an audio output speaker 90 for broadcasting audio to the individual located adjacent thereto. The on/off switch 74 also controls the volume for the speaker 90. The channel select switch 75 may be an A-B switch, or alternatively, may be a channel select switch with a plurality of channel selections. The channel select switch 75 may be used to either switch channels to avoid interference from other electronic pieces of equipment or to listen to several different electronic devices through one receiver 56. The audio output speaker 90 is also electrically integrated to the receiver circuitry, and, indirectly, to the receiver antenna 82.

The receiver and storage case 56 includes an opening 91 so as not to block the remote control unit signal during operation of the remote control 64 to control the electronic equipment. In order to prevent the remote control unit 64 from sliding out of the front end 66, the receiver and storage case 56 includes at least one pair of restraining bars or posts 92 that extend between and are attached to the floor 60 and the underside of the bridging member 84. The restraining bars 92 are positioned so that they do not block the signal transmission from the remote control unit 64 to the television set 24, and extending through the restraining bars 92 are both the audio output speaker wires and battery recharge wires. Alternatively, any suitable type and size of storage case 56 may be used, such as a rigid housing, a soft, flexible case, a telescoping container, a leather case, a leather and plastic combination, or the like.

Figure 7:
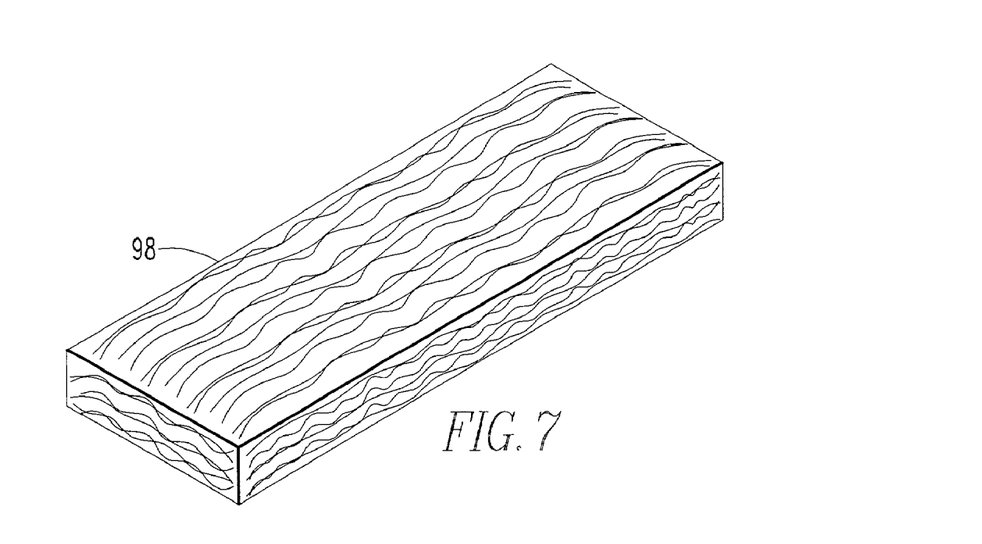
FIG. 7 is a perspective view of a filler member preferably composed of foam rubber.
Figure 9:
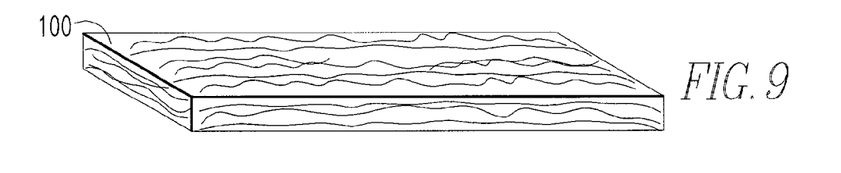
FIG. 9 is a perspective view of a second filler member for disposition on a floor of the remote control unit receiver and storage case.

In order to accommodate remote control units of various sizes and shapes, the apparatus 10 includes several accessory structures that can be attached to or inserted into the receiver and storage case 56 in order to cushion and fill the remote control unit hold 62 thereby providing a secure seating or placement for the remote control unit 64 in the hold 62. Illustrated in FIGS. 1, 3 and 8 are a pair of spacer brackets 94 that are adapted for removable securement to the inner surfaces of each sidewall 58 by the insertion of the fasteners 80 through the respective spacer bracket adjustment apertures 78 for attaching the spacer brackets 94 adjacent and parallel to each sidewall 58. Each spacer bracket 94 may be composed of or may have affixed thereto a cushioning member 96 preferably composed of foam, foam rubber, rubber padding, or the like to prevent the remote control unit 64 from being marred or 5 damaged. In addition, the spacer bracket may be a filler member 98, as shown in FIG. 7, to fill in the hold 62 and accommodate short length remote control units. Also, the spacer bracket may be a filler member 100, as shown in FIG. 9, that can be lain on the floor 60 of the hold 62 to further cushion any remote control unit set therein.

There are a number of different ways to dispose the apparatus 10 in its operative position for transmitting audio from the selected piece of electronic equipment to the individual seated or located at some distance removed from the given piece of electronic equipment. As shown in FIG. 10, the apparatus 10 can be mounted directly on or against the television set 24 by inserting fasteners 46 through the mounting screw apertures 48 of the audio transmitter 12 and into the housing or frame of the television set 24. Alternatively, as discussed hereinabove, Velcro may be used. This type of physical mounting should place the audio transmitter 12 adjacent to the speaker of the television set 24 for optimum audio detection. Thus, the audio transmitter 12 can be placed against the television set housing and the receiver and storage case 56 can then be hung up on the audio transmitter 12 whereupon the bridging member 84 can then be brought into engagement with the transmitter cradle portion 38 of the audio transmitter 12. The engagement of the bridging member 84 to the transmitter cradle portion 38 forces the on/off switch 40 to the off position thus hanging up and shutting off the apparatus 10. When the receiver and storage case 56 is lifted off the audio transmitter 12, the bridging member 84 disengages from the transmitter cradle portion 38 and the on/off switch 40 moves to the on position so that the apparatus 10 can be turned on and readied for use. The channel select switches 41 and 75 is positioned at an operational channel.

Alternatively, the apparatus 10 can also be placed on the floor 60 adjacent to the speaker of the television set 24 if the individual does not want to mar the television set housing by drilling holes into it. Although it is not specifically shown in FIG. 10, especially for later model television sets, the audio transmitter 12 can be mounted over the television speaker so that television audio would be received and conveyed through the audio detection portal 26 for processing by the transmitter circuitry of the audio transmitter 12. The apparatus 10 can be disposed for use in a similar manner on, against, or adjacent to other types or pieces of electronic equipment.

As described hereinabove, for newer models of televisions, or other electronic equipment, the transmitter 12 can be electrically connected to the television or other device by connecting an electrical cord between the audio input port 34 of the transmitter 12 and the audio jack of the piece of equipment.

In operation, the remote control unit 64 is inserted into the receiver and storage case 56. The desired number of the spacer brackets are installed within the receiver and storage case 56 for securely housing the remote control unit 64 within the receiver 56. The transmitter 12 is mounted on or close to the electronic equipment. The transmitter 12 is plugged into the power supply 54, or alternatively, batteries are installed. The receiver 56 is either charged or batteries are installed. The receiver 56 and the transmitter 12 are turned on and audio from the electronic equipment is transmitted from the transmitter 12 through the speaker 90 of the receiver 56.

For the various embodiments of this invention, the same reference characters will be used to designate like parts. In addition, like functions and like interactions of the parts among the various embodiments of this invention will not be repeated for each embodiment.

Figure 11:
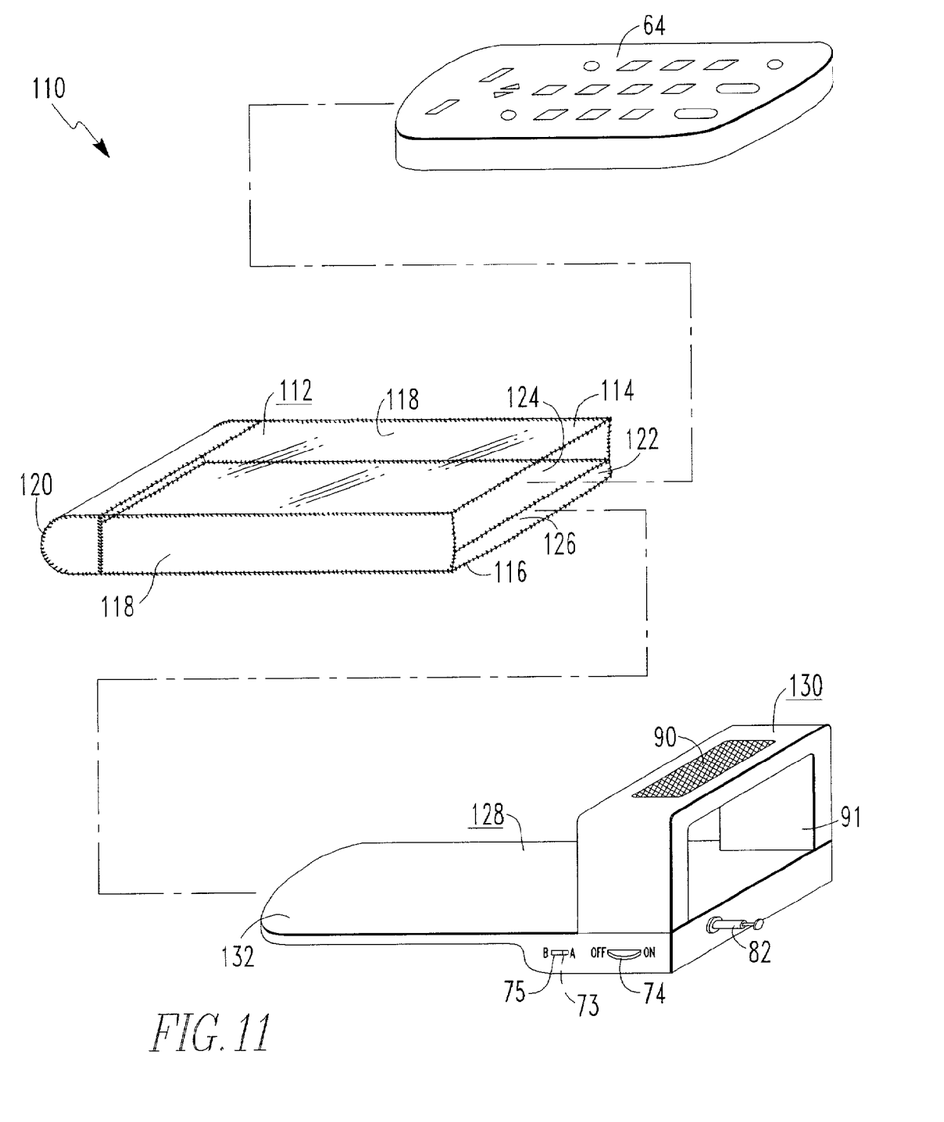
FIG. 11 is an exploded view of an alternative embodiment of the remote control unit receiver and storage case of FIG. 2.
Figure 12:
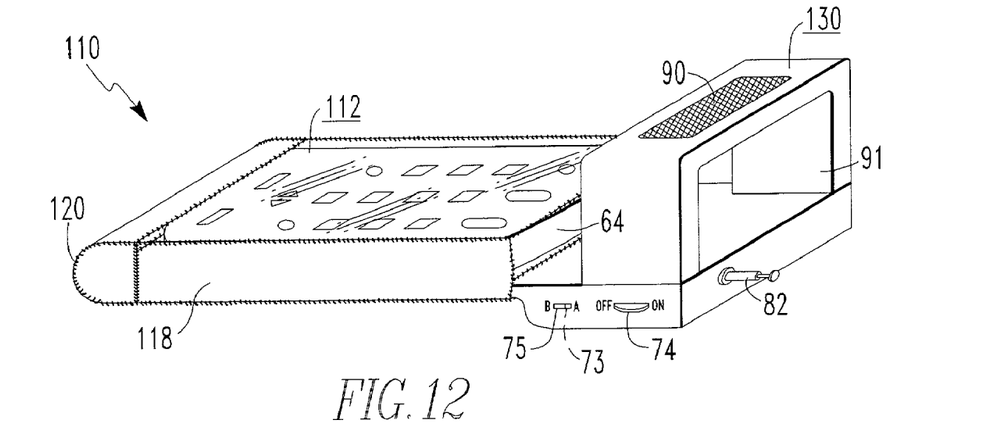
FIG. 12 is a perspective view of the audio receiver and storage case of FIG. 11.
Figure 13:
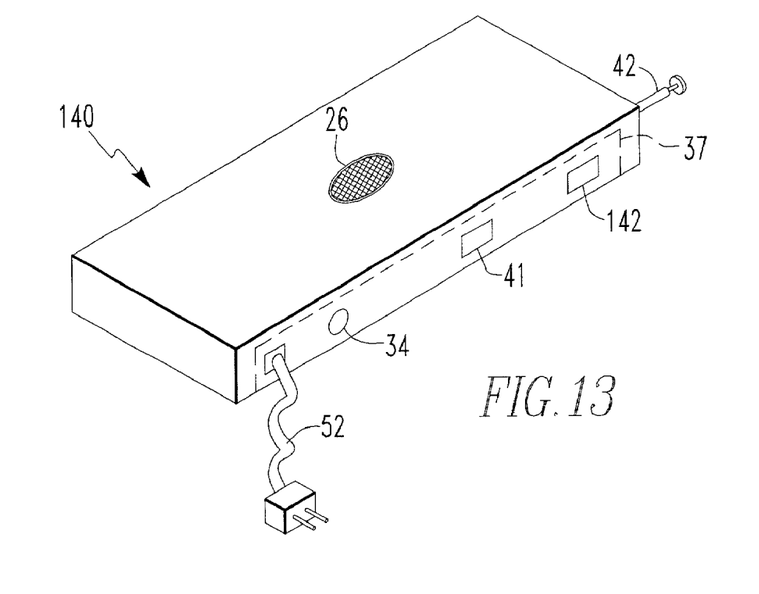
FIG. 13 is a perspective view of an alternative embodiment of the audio transmitter of FIGS. 5 and 6.

Referring to FIGS. 11–13 and using the same reference characters to define like parts, an alternative embodiment of the audio transmitter and remote control unit receiver and storage apparatus 10 as illustrated in FIGS. 1-10 may be an audio transmitter and remote control unit receiver and storage apparatus 110 having like parts as the audio transmitter and remote control unit receiver and storage apparatus 10 and having the remote control unit receiver and storage case 56 formed of two components. The first component of the remote control unit receiver and storage case 56 of the receiver and storage apparatus 110 is a storage case 112 having a transparent front side 114, a back side 116, a pair of sidewalls 118, and a bottom side 120. A partition 122 is positioned between and parallel to the front side 114 and the back side 116 for forming a first pocket 124 between the front side 114 and the partition 122 and a second pocket 126 between the back side 116 and the partition 122. The remote control unit 64 may be slid into the first pocket 124 having the buttons on the remote control unit 64 facing the transparent front side 114 for enabling a person to view the remote control unit 64. Preferably, the front side 114 is flexible for also enabling a person to push on the front side 114 and depress the buttons on the remote control unit 64. Preferably, the storage case 112 is an expandable leather case for accommodating various sized remote controls 64.

The second component of the remote control unit receiver and storage case 56 of the receiver and storage apparatus 110 is a receiver component 128 having an audio housing 130 and a support member 132. The audio housing 130 houses the speaker 90, the receiver circuitry 73, the on/off switch 74, the channel select switch 75, the opening 91, and the antennae 82 described hereinabove. The support member 132 extends from the audio housing 130 and is inserted into the second pocket 126 of the storage case 112. The support member 132 is sized approximately equivalent to the size of the second pocket 126 for securely containing the receiver component 128 within the storage case 112.

Alternatively, the storage case 112 and the receiver component 128 can be formed together as one unit. The bottom end 120 may be an open end for enabling the remote control 64 to be inserted therethrough. For this embodiment, the first pocket 124 will house the remote control 64 and the receiver component 128 may be integrally formed with the second pocket 126, may be the bottom surface of the first pocket 124, and/or may be the bottom surface of the storage case 112.

Referring to FIG. 13 and using the same reference characters to define like parts, an alternative embodiment of the audio transmitter 12 as illustrated in FIGS. 1–10 may be an audio transmitter 140 having like parts as the audio transmitter 12 and having an on/off switch 142 in place of the rocker switch 40. The audio transmitter 140 includes the audio detection portal 26, the channel select switch 41, the transmitter circuitry 37, and the antenna 42, the electrical cord 52 as described hereinabove. As discussed hereinabove, the audio transmitter 140 may be battery operated, eliminating the electrical cord 52. Alternatively, the audio transmitter 140 may be any suitable type of transmitter. For this embodiment, the transmitter cradle portion of the transmitter 140 and the bridging member of the receiver 110 are eliminated.

Alternatives may include housing a flashlight, a beeper, a clock, a radio, and/or a LCD video monitor in the storage case part of the invention.

Additional advantages of the audio transmitter remote control unit receiver and storage apparatus include that a user is less likely to loose the remote control unit 64 due to keeping the remote control close at hand to hear the audio emanating from the receiver storage case 56. Also, due to the requirement to hang up the receiver after use to recharge the battery, the remote control unit 64 is safely stored adjacent to the electronic equipment.

Another advantage is that the receiver and storage case 56 protects the remote control unit from damage and is adaptable for various sizes and types of remote control units 64.

The foregoing is considered as illustrative only of the principles of the invention. Since numerous modifications and changes will readily occur to those skilled in the art, it is not desired to limit the invention to the construction shown and described. Accordingly, all suitable modifications and equivalents may be resorted to falling within the scope of the invention.

What is claimed is:

1. An audio transmitter and remote receiver apparatus, comprising:
    an audio transmitter for disposition adjacent electronic equipment and including an audio detection portal for receiving audio transmissions from the electronic equipment and an audio transmitter antenna for transmitting audio signals to a location removed from the electronic equipment;
    a remote control unit receiver case forming a remote control unit hold for storing a remote control unit therein, the case having an opening therethrough and having a receiver antenna for receiving the audio signals from the audio transmitter;
    the remote control unit being a separate unit removably positionable within the remote control unit hold of the remote control unit receiver case, and during operation of the remote control unit, signals from the remote control unit passable through the opening of the remote control unit receiver case for controlling the electronic equipment;
    the remote control unit receiver case having an audio output speaker for conveying audible sounds from the electronic equipment to at least one individual located adjacent to the remote control unit receiver case.

2. The audio transmitter and remote receiver apparatus of claim 1 wherein the audio transmitter includes an audio input port for electrically connecting the audio transmitter to the electronic equipment so that the audio transmissions can be sent from the electronic equipment to the audio transmitter.

3. The audio transmitter and remote receiver apparatus of claim 1 wherein the remote control unit receiver case further comprises:
    a receiver component having an audio housing and a support member, the audio housing having the audio output speaker and the receiver antenna, the support member being an elongated member extending from the audio housing; and
    a storage case having a first pocket and a second pocket, the first pocket sized and adapted for receiving the remote control unit and the second pocket sized and adapted for receiving the support member of the receiver component, the audio housing extending from the storage case for conveying audible sounds.

4. The audio transmitter and remote receiver apparatus of claim 1 further comprising at least one spacer bracket disposed within the remote control unit hold and mountable thereto in order to hold non-standard sized remote control units within the hold.

5. The audio transmitter and remote receiver apparatus of claim 1 wherein the remote control unit receiver case and the audio transmitter include a channel select switch for providing at least two channels of operation.

6. The audio transmitter and remote receiver apparatus of claim 1 wherein the remote control unit receiver case has a bridging member.

7. The audio transmitter and remote receiver apparatus of claim 6 wherein the audio transmitter includes a first upper side and an opposite second lower side, and further comprising:
    the television audio transmitter including a pair of spaced-apart battery recharge poles located on the first upper side for allowing the remote control unit receiver case to be electrically energized from at least one battery; and
    the bridging member including a pair of spaced-apart battery recharge contacts that are engagable by the battery recharge poles of the audio transmitter when the remote control unit receiver case is placed on the audio transmitter.

8. The audio transmitter and remote receiver apparatus of claim 6 wherein the audio transmitter includes a transmitter cradle portion which is shaped to receive the bridging member so that the bridging member can be selectively engaged to and disengaged from the transmitter cradle portion.

9. The audio transmitter and remote receiver apparatus of claim 8 wherein the transmitter cradle portion includes an on/off switch that is engaged and shifted to the off position when the bridging member is placed on the transmitter cradle portion, and wherein the disengagement of the bridging member from the transmitter cradle portion causes the on/off switch to shift to the on position thus turning on the audio transmitter so that the audio transmitter can receive the audio transmissions from the electronic equipment.

10. An audio transmitter and remote receiver apparatus for transmitting audio signals produced by electronic equipment to a location removed from the electronic equipment, comprising:

an audio transmitter for disposition adjacent to the electronic equipment, the audio transmitter including an audio input jack for electrically connecting the electronic equipment to the transmitter so that audio transmissions can be sent from the electronic equipment to the audio transmitter, and having an audio transmitter antenna for sending audio signals based on the audio transmissions that are received by the audio transmitter;

an audio receiver remote control unit storage case for disposition at a location that is removed from the electronic equipment for containing at least one remote control unit therein, and having a receiver antenna for detecting the audio signals sent from the audio transmitter antenna;

the remote control unit storage case including a receiver component having an audio housing and a support member, the audio housing having the receiver antenna and the support member being an elongated member extending from the audio housing;

the remote control unit storage case also including a storage case having a first pocket and a second pocket, the first pocket sized and adapted for receiving the remote control unit and the second pocket sized and adapted for receiving the support member of the receiver component, the audio housing extending from the storage case for conveying audible sounds; and the audio housing of the audio receiver remote control unit storage case having an audio output speaker for conveying audible sounds from the electronic equipment to at least one individual located adjacent to the audio receiver remote control unit storage case containing therein the remote control unit.

11. The audio transmitter and remote receiver apparatus of claim 10 wherein the audio transmitter includes an audio detection portal for receiving audio transmissions from the electronic equipment without a direct electrical connection.

12. The audio transmitter and remote receiver apparatus of claim 10 wherein the audio receiver remote control unit storage case and the audio transmitter include a channel select switch for providing at least two channels of operation.

13. The audio transmitter and remote receiver apparatus of claim 10 further comprising at least one spacer bracket disposed within the remote control unit hold and mountable thereto in order to hold non-standard sized remote control units within the hold.

14. The audio transmitter and remote receiver apparatus of claim 10 wherein:

the remote control unit receiver case has a bridging member;

the audio transmitter includes a transmitter cradle portion on which the bridging member is selectively placed and removed therefrom; and the transmitter cradle portion includes an on/off switch that is shifted to the off position when the bridging member is placed on the transmitter cradle portion and is shifted to the on position when the bridging member is removed from the transmitter cradle portion.

15. The audio transmitter and remote receiver apparatus of claim 14 wherein the audio transmitter includes a first upper side and an opposite second lower side, and further comprising:

the television audio transmitter including a pair of spaced-apart battery recharge poles located on the first upper side for allowing the audio transmitter to be electrically energized from at least one battery; and the bridging member including a pair of spaced-apart battery recharge contacts that are engagable by the battery recharge poles of the audio transmitter when the remote control unit receiver case is placed on the audio transmitter and the bridging member is seated on the transmitter cradle portion.

16. An audio transmitter and remote receiver apparatus for transmitting audio signals from electronic equipment to a remote location and for holding a remote control unit, comprising:

an audio transmitter for disposition adjacent to the electronic equipment, the audio transmitter including an audio input port and an audio detection portal both of which can receive audio transmissions from the electronic equipment, a transmitter cradle portion having an on/off switch that is selectively shiftable between an on position and an off position, an audio transmitter mechanism for transmitting audio signals based on the audio transmissions received from the electronic equipment to locations that are removed from the electronic equipment, and a multi-channel select switch with at least two channels of operation;

an audio receiver and remote control unit storage case for disposition at the location that is remote from the electronic equipment and that includes a front end, an opposite rear end, a floor, a pair of sidewalls with each sidewall extending upwardly from opposite sides of the floor in order to form a remote control unit receptacle for holding at least one remote control unit therein, a receiver located adjacent the front end for detecting the audio signals sent from the audio transmitter mechanism, and a bridging member mounted on the sidewalls adjacent the front end;

the bridging member including an audio output speaker for conveying audible sounds to at least one individual located adjacent to the audio receiver and remote control unit storage case; and the bridging member capable of selective engagement with and disengagement from the transmitter cradle portion in order to selectively shift the on/off switch from the off position to the on position.

17. The audio transmitter and remote receiver apparatus of claim 16 wherein the audio receiver and remote control unit storage case includes at least one opening for enabling a signal from the remote control unit to be transmitted for remotely controlling the electronic equipment.

18. The audio transmitter and remote receiver apparatus of claim 16 further comprising at least one spacer bracket disposed within the remote control unit receptacle and mountable thereto in order to hold non-standard sized remote control units within the receptacle.

19. The audio transmitter and remote receiver apparatus of claim 16 further comprising a volume control connected to the speaker of the audio receiver and remote control unit storage case for controlling the volume of the audio emanating from the speaker.

* * * * *